May 10, 1949. F. RIEBER 2,469,785
FREQUENCY CONTROLLED TRANSDUCER
Filed Jan. 29, 1944
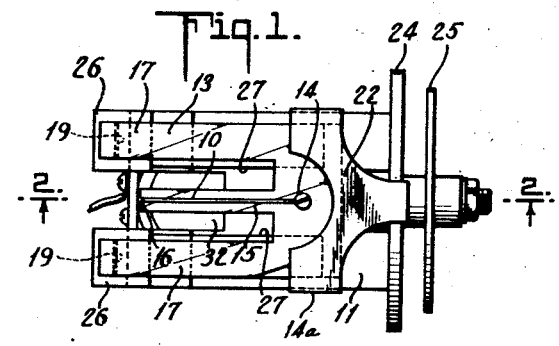
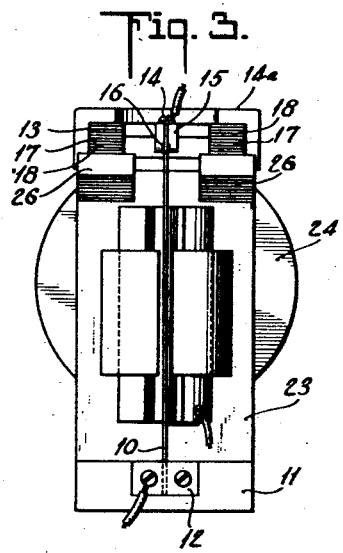
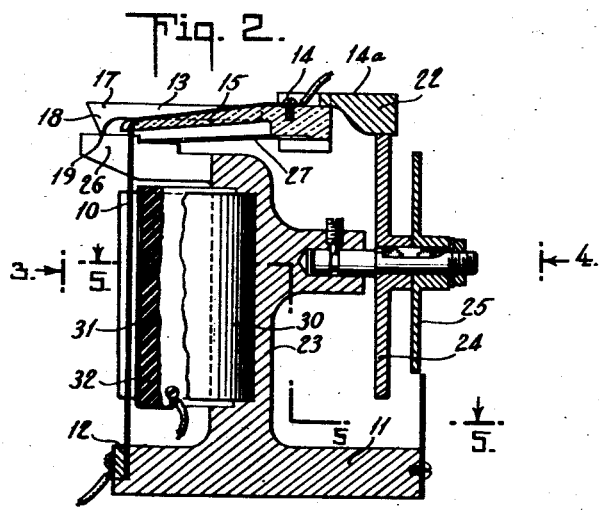
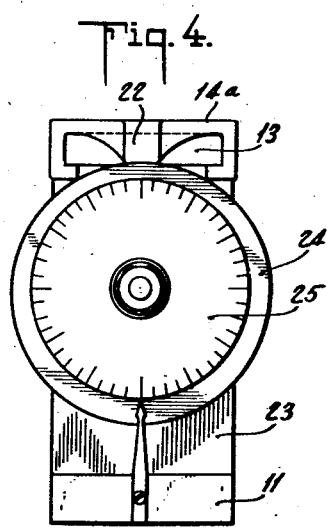
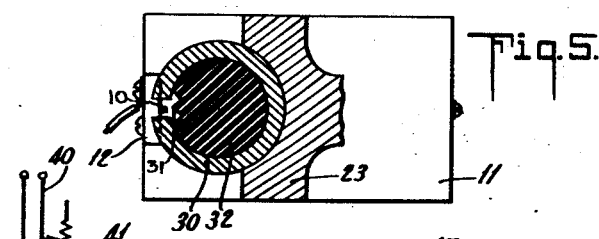
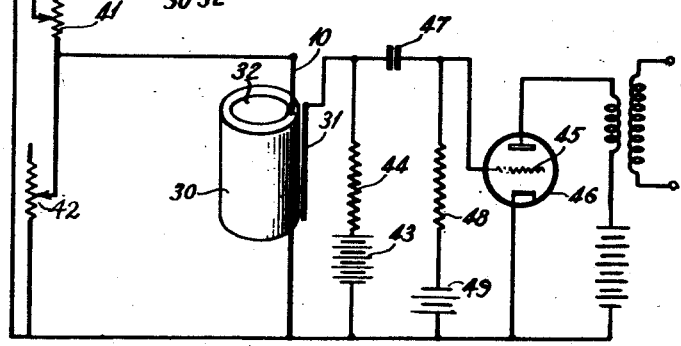
INVENTOR
FRANK RIEBER
BY
ATTORNEY Patented May 10, 1949

2,469,785

UNITED STATES PATENT OFFICE 2,469,785

FREQUENCY CONTROLLED TRANSDUCER

Frank Rieber, New York, N. Y., assignor to Interval Instruments, Inc., New York, N. Y., a corporation of New York Application January 29, 1944, Serial No. 520,196

13 Claims. (Cl. 178—44)

This invention relates to a system of transferring electrical energy from one circuit to another, or from one portion to another, through the medium of a mechanical body, such a device being commonly called a transducer.

It is an object of this invention to provide a transducer in which the energy is transferred from the first electrical circuit solely by means of the motion of the mechanical element, and in which no such transfer can occur except through such motion.

It is a further object to provide a device in which the motion of the mechanical element is completely under control so that the device is capable of selecting at will the energy which will be transferred, the selection occurring through the medium of the control of the mechanical body.

It is a further object of this device to provide a transducer system in which the mechanical characteristics of the transducer may be altered while in use, and more particularly in which these alterations may occur as a continuous function.

It is a further object to provide a transducer in which the response of the instrument to its controls is so sharp that it may be used accurately to measure the characteristics of an incoming signal or may be so utilized as to respond to an incoming signal only when that signal has sharply defined predetermined characteristics.

It is a further object to provide a device which, when used in connection with an oscillator circuit, may create an alternating frequency of substantially pure sine wave free from harmonics.

It is a further object to provide a device which may be caused to respond to an incoming wave and give off its energy to the second circuit regardless of whether the received energy is in the form of electrostatic variations or of current variations.

It is a further object to provide a system in which the alteration of the constants of the mechanical body will be observable and will bear a precise relation to the physical constants which are utilized to produce it, so that the frequency may be measured by the observable alterations which produced it or in which the alterations may be determined by measuring the changes in frequency.

It is a further object to provide a transducer in which the fundamental frequency of the mechanical element by which the transfer of energy is determined is not affected by either of the two electrical circuits between which it transfers energy regardless of the direction in which the energy is transferred, that is, a device in which the periodicity of the mechanical element is the sole factor affecting the transfer of energy.

It is a further object to provide a transducer which can transfer energy by means of a mechanical element which can be controlled, and the control of which sharply determines what portion of the received electrical energy shall be selected for transfer.

A device of this character has many uses. For example, it may be connected into the feed back of an amplifier to make it oscillate so that the frequency may be rigorously confined to the controlling periodicity of the controllable member. The device may also be used to recognize at a distance the frequency of signals transmitted by such an oscillator either by creating a second oscillating system or by the use of the invention as a selector filter. In the particular embodiment here chosen for illustration, I have selected a wire as the vibrating body. Such a wire, when it is maintained taut, will vibrate, as is well known, at a frequency dependent upon its weight, its length and its tension. The rate of vibration may therefore be readily controlled by varying the length or tension of the wire.

Prior attempts have been made to utilize a vibrating body to cause the transfer of energy between electrical circuits and to select the energy which shall be transferred, but the constructions proposed have not been such as to insure adequate selectivity and to maintain the selectivity immune to the external conditions in the two circuits. These attempts, therefore, have not secured a positive and sensitive control of the frequency transferred independently of the frequencies of the circuits and of other circuit conditions. Such attempts, therefore, have been of very limited usefulness. One method of moving the body, for example, is to make it of magnetic material, such as iron or nickel, so that it can be attracted toward an electromagnet, the field of which is energized by a current, the frequency of which is determined by the body. Such a system bears the defect that as the body approaches the magnet pole, the strength of the magnetic field becomes much greater. This variation in the intensity of the field as the body approaches the pole creates a variation in the instantaneous rate of vibration of the body, so that a change in the amplitude of vibration will produce a corresponding error in the frequency within the instrument itself.

One form of such systems employed a permanent magnet to the poles of which there was attached a small electromagnet connected to be operated by the pulsating current. Thus both halves of the pulsating current may play their part in keeping the body in motion, but subject to the limitations I have mentioned above.

Such systems have also proposed to control the driving current from the body itself by using the movement of the body to make and break a contact, but such a control system is troublesome and unreliable, and it gives only one impulse of current at an undesirable portion of the cycle.

There is another difficulty which is experienced when the mechanical body is maintained in vibration by electromagnets attracting the body, and that is that the localized position of the magnet has tended to distort the vibration from a unitary vibration by inducing higher harmonics of substantial magnitude. Moreover where an electromagnetic pickup has also been used, energy has been transferred from between the operating magnet and the pickup magnet, which defeats the purpose of the instrument.

To avoid these difficulties, I utilize a different principle of imparting motion to the vibrating body—such, for example, as a wire, in accordance with which at every point in its motion the force acting to move the wire is proportionate to the instantaneous value of the current producing it, and which does not react to alter or modify that frequency. I also employ a different controlling means for the electric circuit which generates a full wave control circuit and which may be used to create a closely approximate sine wave control circuit if desired.

In this specification I refer to the vibrating body as a wire, and ordinarily I make the body of a round wire of tungsten about .001" in diameter, since the most satisfactory results are obtained by such a wire which has the combined qualities of great strength and low temperature coefficient. It will be clear, however, that any suitable material may be employed which has elastic and conducting properties, and the wire may take the form of a flat ribbon with its long diameter parallel to the lines of force. Such a ribbon would give greater electrostatic control forces, but this is not of great advantage and a ribbon is otherwise less desirable.

As another example of vibratory mechanical systems coupled to electric circuits, the so called control crystals, cut from crystalline quartz, are introduced into the circuits of radio frequency oscillators. In the case of such crystals, the electric circuit which drives the quartz crystal, by means of its piezoelectric properties, is likewise the circuit upon which the vibrating crystal reacts. In other words, the input and output terminals are the same. The effect, however, is analogous to the effect of coupling a tuning fork between a driving and a driven circuit, as above referred to.

Accordingly, my invention not only provides a mechanical system into which vibratory energy may be transferred from one electric circuit, and from which vibratory energy may be conveyed into a second electric circuit, but also means whereby the frequency of the mechanical system may be varied at will, during operation, by the application of force. And, further, it provides means by which the known and predetermined ratio between the applied force and vibratory frequency of this system may be utilized to accomplish many useful and practical results in the field of physical measurements.

The invention accordingly comprises a machine possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which:

Fig. 1 is a plan view of a device embodying this invention.

Fig. 2 is a section along the line 2—2 of Fig. 1.

Fig. 3 is an end view from the rear.

Fig. 4 is an end view from the front.

Fig. 5 is a section along the line 5—5 of Fig. 2.

Fig. 6 is a wiring diagram showing a use of the device.

In the drawings, the numeral 10 indicates a vibrating member comprising a wire, the lower end of which may be clamped to a base 11 by a small plate 12. The upper end of the wire extends over an insulating member 13 which may be conveniently made of quartz, and it is fastened to a terminal 14 upon the insulating member. As will be seen from Fig. 1, the member 13 is fixed at its rear end into a socket member 14 and has its forward end divided into three outwardly extending parallel arms. The central one of these arms 15 extends to the point where it carries the wire 10, as described, and it is provided at its outer end with a notch 16, which, at the same time, gives a smooth surface over which the wire may bend and confines the wire to the central position.

The outer two of the three arms, bearing the numeral 17, carry pivot bearings. As shown, they are provided at their outer ends with lugs 18 ground to knife edges 19 to serve as pivots about which the member 13 may pivot. In order that this pivoted motion may serve to alter the tension on the wire 10, the knife edges 19 are out of line with the wire 10, the arms 17 being for this purpose carried beyond the wire to bring the knife edges to the left thereof, so that as the socket member is tilted upwardly, the wire 10 will be stretched. The socket member itself has a rearwardly extending arm 22 by which this tilting motion may be accomplished.

Pivoted to a pedestal 23 on the base 11 is a disc cam 24 controlled by a graduated dial 25. The peripheral surface of this cam bears against the underside of the arm 22 and the cam periphery is so cut that equal divisions on the dial will represent equal changes in the frequency of the vibrating wire. In such a wire the tension varies as the square of the frequency, so that for equal divisions on the dial, the increase in the diameter of the cam must also vary as the square of the angle through which it is turned. Since this instrument operates on changes in tension in the wire without material change in its length, resiliency is provided between the cam pivots and the end of the wire, preferably by making one or more of the arms resilient, for example the arm 13.

The knife edges 19 rest upon anvils 26 carried by the pedestal 23. To determine the exact position of the knife edges upon the anvils, and hence the exact position of the wire 10 relative to the other parts of the instrument, thin leaf springs 27 are fixed at one end to the socket member 14 and at the other to the pedestal 23. These springs normally serve no purpose in imposing any tension on the wire 10, since they are very light and are normally unflexed.

As above mentioned, the turning of the cam does not materially alter the position of the upper end of the wire. Rather it imposes increased tension on the wire by flexing the arms of the member 13. In normal conditions the slight stretching of the wire itself may be ignored, but in any event it has a fixed relation to the other constants and it may be compensated for by a change in the dial graduations.

The central portion of the wire 10 lies in the field of a magnet 30 which is shown in the form of a small C-shaped permanent magnet supported by the pedestal 23, the wire being situated midway between the open ends of the magnet. With such an arrangement, as is well known, if current is caused to flow in the wire 10, it will tend to force the wire either into or out of the magnet dependent upon the direction of the current flow. If, however, the wire be taut and the current varied rapidly in direction and amount, there will be substantially no response by the wire, unless the current is of a character to give impulses to the wire which are synchronous with the natural vibration of the wire. The wire will vibrate, however, if such synchronized impulses occur, regardless of whether they be the fundamental or result from an harmonic of the imposed wave.

Adjacent to the wire 10 and parallel to it there is provided an electrode 31. This electrode may take the form of a knife edge, but I have found it convenient to employ a small wire firmly supported in place. The purpose of this electrode is to serve as one "plate" of a condenser, the other "plate" of which constitutes the vibrating wire, and this terminal is fixed in the plane of vibration of the vibrating wire so that during the vibration, the wire moves to and away from the terminal, thereby reducing and increasing the capacity of the condenser.

A convenient, practical way of supporting this terminal is shown in the drawings in which there is inserted within the magnet 30 an insulating member 32, having imbedded in its surface a small wire constituting the terminal. At the point where the terminal 32 is carried by the insulator, the surface of the latter may be ground off in order to place the terminal at the optimum distance from the vibrating wire, and in order to increase the leakage surface between this terminal and the magnet 30, I prefer to cut a groove 34 in the surface of the insulator on each side of the wire. In making the device in accordance with this embodiment, however, it is desirable that the outer surface of the terminal shall be exposed, rather than being covered by any of the insulating material, since in the latter case electrostatic effects may occur upon the covering insulation which will alter the operation of the device.

In utilizing this device, it will be understood that the current flowing through the wire 10 is the current to which the instrument responds and that its responds to that current, if the wire be under tension, will occur only when some component of that current is in tune with the natural period of vibration to which the wire 10 is momentarily adjusted.

The condenser effect between the wire 10 and the electrode 31 is utilized to control a second electrical circuit or another portion of the same electrical circuit by the vibrations of the wire. Such a circuit is shown in Fig. 6 in which the incoming current flows between the electrodes 40 and 41 and through the wire 10. As illustrated, there is imposed in series with the line current a variable resistance 41 to limit the amount of current flowing through wire 10, since the wire 10 is of relatively low resistance. For some purposes it may be desirable to place a variable resistance 42 in shunt with the wire 10. With these two resistances, it will be clear that the response of the instrument can be varied over a wide limit. The instrument is extremely sensitive to frequency. In some uses this is an important quality. The effect of the resistance 42 serving as a shunt around the wire tends to broaden its range by making it not respond so sharply, which in some cases is desirable.

The particular circuit illustrated in Fig. 6 to utilize the instrument shows a battery 43 imposing a substantial potential between the electrode 31 and the wire 10 through an impedance 44. The terminal 31 is connected to the grid 45 of a vacuum tube 46 through a condenser 47, there being the usual grid leak resistance 48. With this circuit it will be clear that the wire 10 will vibrate only when the circuit 46 has a component in synchronism with it. Until such time, therefore, there will be no variation in the vacuum tube circuit.

As soon, however, as the wire 10 vibrates toward and from the electrode 31, the variation in capacity produced by the vibration will produce an alternating potential upon the condenser 47, and hence upon the grid 45, and this alternating potential will produce a corresponding but amplified current in the plate circuit in the usual manner.

It will be clear from the construction shown that there is no corresponding effect by which the vacuum tube circuit can alter or induce vibration in the wire 10, since the only connection between them is electrostatic and the electrostatic attraction is insignificant. By this construction, therefore, it will be clear that the incoming circuit may be caused to induce in the secondary circuit a current only when it has a component in harmony with the frequency for which the instrument is set.

With the above construction, moreover, by a proper choice of dial graduations, the incoming signal in the form of a variable frequency current may be read directly in terms of any quantity with which the frequency has a fixed relation. Thus in any system in which temperature or weight or humidity or any other constant is measured and translated into frequency, the instrument of this invention may be used to retranslate that signal and read it directly in terms of the quantity itself, that is in degrees, pounds or degrees of humidity.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A device of the character described, comprising a framework, a wire having one end attached to said framework and the other carried by a resilient member, the resilient member comprising an arm pivoted to the framework, and an arm for carrying the end of said wire, at least one of said arms being resilient, said wire and said arms being spaced from each other in the direction transverse to the axis of the pivot, and an arm attached to said resilient member substantially longer than the distance between the pivot axis and said wire, and a cam engaging said long arm to move said resilient member about said pivot to change the tension on said wire, and a permanent magnet having poles parallel to and on opposite sides of said wire.

2. In a device of the character described in combination, a substantially cylindrical insulating member having a linear conducting element embodied in the surface thereof, and a magnet supported by said member, having its free poles on opposite sides of said element.

3. In a device of the character described in combination, a substantially cylindrical insulating member having a linear conducting element embodied in the surface thereof, means upon said member for supporting a wire parallel to and adjacent to the element, and a magnet supported by said member having its free poles upon the opposite side of said wire.

4. A device in accordance with claim 2, in which the surface of the element is exposed.

5. A device in accordance with claim 2, in which said member is provided with a groove cut in its surface on each side of said element to minimize the surface leakage, and in which said element is exposed.

6. In a device of the character described in combination, an insulating cylindrical member having a linear conducting element embodied in the surface thereof, a permanent magnet surrounding and supported by said member, having its poles on opposite sides of said element, and means for supporting a wire between said poles.

7. In a device of the character described in combination, means for supporting both ends of a wire, including means for imposing a controllable tension on said wire, means for maintaining a magnetic field transverse to said wire, means for passing an electric current through said wire, and a linear electrode adjacent to and parallel to said wire, a vacuum tube amplifying system connected to have its grid actuated by the change in capacity between the wire and electrode caused by the vibration of said wire toward and from said electrode.

8. In a device of the character described in combination, a member having three parallel arms, the central arm having means to position one end of a wire and the outer two arms having, each, a knife-edge-pivot thereon, said pivot being out of alignment with the position of said wire, a rearwardly extending arm carried by said member, at least one of said arms being resilient, a cam positioned to engage said rearwardly extending arm to move said member about said pivot, a wire in said support, and means to support the other end of said wire.

9. In a device of the character described in combination, a resilient insulating arm, having at one end means to position one end of a wire, a socket member to which said arm is attached, said resilient arm being partly cut away between its end and said socket member, whereby its resiliency is localized between the socket member and the wire support, and variations in the connections between the socket member and said arm do not vary the resiliency of said arm.

10. In a device of the character described, a magnet, a stretched wire transverse to the field of said magnet, a linear electrode adjacent to and parallel to said wire and spaced from said wire in a direction transverse to said field, and an electric circuit controlled by the variations in capacity between said wire and said electrode.

11. In a device of the character described, in combination, a wire, means for supporting said wire in taut condition, means for creating a field of magnetic force about said wire, substantially uniform throughout the vibrating portion of its length, means for supplying alternating electric power to maintain the wire in oscillation, an amplifying system, and means substantially coextensive with the vibrating portion of the wire for controlling the current in said amplifying system by said vibration.

12. A device of the character described comprising a frame, a wire, a support upon said frame for one end of said wire, a lever pivoted to said frame having a short and a long arm, a support for the other end of said wire mounted upon said short arm, rotary means for adjusting the position of said long arm to vary the tension on said wire, a magnet supported from said frame with its pole faces parallel to and spaced from said wire to exert a magnetic field transverse to said wire, and a linear electrode parallel to said wire and spaced therefrom in a direction transverse to said field, and terminals leading from said electrode and from the ends of said wire.

13. A device of the character described comprising a frame, a wire, a supporter upon said frame for one end of said wire, an anvil upon said frame, a lever having a connection for the other end of said wire, and having a knife edge closely adjacent thereto, said lever having an arm extending out beyond said support and rotary means engaging said arm to vary the tension on said wire, a magnet supported from said frame with its pole faces parallel to and spaced from said wire to exert a magnetic field transverse to said wire, and a linear electrode parallel to said wire and spaced therefrom in a direction transverse to said field, and terminals leading from said electrode and from the ends of said wire.

FRANK RIEBER.

REFERENCES CITED

The following references are of record in the file of this patent:

UNITED STATES PATENTS

| Number | Name | Date |
| --- | --- | --- |
| 2,014,514 | Augustadt | Sept. 17, 1935 |
| 2,045,917 | Miessner | June 30, 1936 |
| 2,056,281 | Lakatos | Oct. 6, 1936 |
| 2,180,122 | Severy | Nov. 14, 1939 |
| 2,260,847 | Warren | Oct. 28, 1941 |
| 2,309,994 | Skinner | Feb. 2, 1943 |